(12) United States Patent  (10) Patent No.: US 9,158,394 B2
Mao et al.  (45) Date of Patent: Oct. 13, 2015

(54) STYLUS FOR USE WITH CAPACITIVE TOUCH PANEL

(71) Applicant: WALTOP INTERNATIONAL CORP., Hsinchu (TW)

(72) Inventors: Chung Fuu Mao, Hsinchu (TW); Chia Jui Yeh, Hsinchu (TW); Chien Chia Lien, Hsinchu (TW)

(73) Assignee: WALTOP INTERNATIONAL CORP., Hsinchu (TW)

( * ) Notice: Subject to any disclaimer, the term of this patent is extended or adjusted under 35 U.S.C. 154(b) by 0 days.

(21) Appl. No.: 14/268,421

(22) Filed: May 2, 2014

(65) Prior Publication Data

US 2015/0109239 A1    Apr. 23, 2015

(30) Foreign Application Priority Data

Oct. 18, 2013  (TW) .............................. 102137793 A

(51) Int. Cl.
 *G06F 3/0354* (2013.01)
(52) U.S. Cl.
 CPC .................................. *G06F 3/03545* (2013.01)

(58) Field of Classification Search
CPC ... G06F 3/044; G06F 3/03545; G06F 3/0488; H04N 1/1931
See application file for complete search history.

(56) References Cited

U.S. PATENT DOCUMENTS 8,350,829 B2 *   1/2013   Miyazaki et al. ............. 345/175

* cited by examiner

*Primary Examiner* — Abbas Abdulselam
(74) *Attorney, Agent, or Firm* — Lowe Hauptman & Ham, LLP

(57) ABSTRACT

A stylus provided in the present invention is utilized to input accompanying with a capacitive touch panel. The stylus includes a housing, a magnetic core and a pen tip. The magnetic core is disposed inside the housing. The magnetic core has an axial through hole which defines a bore diameter. The pen tip is disposed at an end of the housing, and the pen tip is made of conductor. The pen tip has a rod portion and a contacting portion. The rod portion is inserted into the axial through hole, and the contacting portion protrudes from the pen shell. The contacting portion has a cylindrical surface and a part spherical surface. The cylindrical surface defines a first diameter; the part spherical surface defines a second diameter. The first diameter is less than the second diameter, and the first diameter is greater than or equal to the bore diameter.

9 Claims, 3 Drawing Sheets

STYLUS FOR USE WITH CAPACITIVE TOUCH PANEL

CROSS REFERENCE TO RELATED APPLICATION

This application claims the priority of TAIWAN Patent Application No. 102137793 filed on Oct. 18, 2013 in the Taiwan Patent and Trademark Office, which is incorporated herein by reference in its entirety.

TECHNICAL FIELD OF THE INVENTION

The present invention relates to an input device, and especially to a stylus with a function of pressure sensing.

BACKGROUND OF THE INVENTION

A capacitive touch panel is a substrate on which transparent electrode patterns are coated. When a finger is closes to or contacts the touch panel, a coupling capacitor is formed between the finger and the transparent electrode patterns because the finger is a conductor and has static electricity. Meanwhile, electrical capacitance of the electrode positioned at a touch point on the touch panel will change, thus making voltage or current on the electrode change. And then by comparing the voltage difference between the electrode and adjacent electrodes, a position of the touch point can be calculated.

However, although the touch input by the fingers is convenient, it is obviously difficult to achieve the following requirements of depicting lines with various thicknesses on a touchscreen, or realizing touch recognition for fine locations by the fingers. Therefore, in order to increase the accuracy of the touch, a solution by using a stylus has been proposed. The principle of the conventional capacitive stylus is mostly to disposed conductive rubber or foam on an end of a metal tube of the stylus. Although it can achieve a more accurate input with respect to the finger input, the capacitive stylus can not show the lines with the various thicknesses on the screen corresponding to force that exerts to the stylus, still having the shortcoming for the usage.

Therefore, in order to realize pressure sensing of the pen tip, an electromagnetic stylus has been proposed. The conventional electromagnetic stylus interacts with an electromagnetic sensor board behind the touchscreen. When the electromagnetic stylus is close to the touchscreen, the electromagnetic sensor board behind the touchscreen will sense an electromagnetic signal emitted from the stylus so as to obtain x and y coordinates of the position of the stylus. In addition, the electromagnetic stylus is equipped with a longitudinal pressure sensor. When a user is writing with the stylus causing the pen tip to be given a force, the pressure is transmitted to the pressure sensor via a pen core. A change of the pressure leads to a variation in the electromagnetic signal emitted from the stylus, and thus the electromagnetic sensor board can appear various pressure-sensitive values according to the signal.

However, the above-mentioned solution for achieving the pressure sensing requires disposing the electromagnetic sensor board behind the touchscreen. It will significantly increase costs.

SUMMARY OF THE INVENTION

Accordingly, an objective of the present invention is to provide a stylus, which has a conductive pen tip being capable of generating a change of the capacitance on the capacitive touch panel for obtain a position signal. Furthermore, it has a special pen tip that is designed to increase contact area on the capacitive touch panel and to keep a size of the pen tip not too large, thereby ensuring accuracy of the writing. Moreover, the stylus of the present invention can also emit the electromagnetic signal to have the function of the pressure sensing.

To achieve the foregoing objectives, according to an aspect of the present invention, the stylus provided in the present invention is utilized to input accompanying with a capacitive touch panel. The stylus includes a housing, a magnetic core, and a pen tip. The magnetic core is disposed inside the housing. The magnetic core has an axial through hole which defines a bore diameter. The pen tip is disposed at an end of the housing, and the pen tip is made of conductor. The pen tip has a rod portion and a contacting portion, wherein the rod portion is inserted into the axial through hole, and the contacting portion protrudes from the pen shell. The contacting portion has a cylindrical surface and a part spherical surface. The cylindrical surface defines a first diameter; the part spherical surface defines a second diameter. The first diameter is less than the second diameter, and the first diameter is greater than or equal to the bore diameter.

In one preferred embodiment, the contacting portion of the pen tip has a coating thereon, and the coating is made of conductor or non-conductor. Preferably, the coating is made of conductive plastic.

In one preferred embodiment, the part spherical surface defines a radian which corresponds to a maximum angle of inclination of the stylus which is capable of being written. Specifically, the radian is between $\pi/2$ and $2\pi/3$. The maximum angle of inclination corresponding to the radian of $\pi/2$ is 45 degrees; the maximum angle of inclination corresponding to the radian of $2\pi/3$ is 60 degrees.

In one preferred embodiment, the stylus further includes an induction coil. The induction coil is disposed inside the housing and disposed around the magnetic core. Moreover, the induction coil is utilized to emit an electromagnetic signal, which corresponds to a pressure on the pen tip while writing.

In comparison with the prior art, the present invention employs the conductive/metallic pen tip, so the stylus can execute a position detection with the capacitive touch panel. In addition, based on the second diameter of the part spherical surface being larger than the first diameter of the cylindrical surface, the contact area between the pen tip and the capacitive touch panel can be increased, thereby increasing the capacitance reaction. In addition, the present invention also can design an appropriate radian of the part spherical surface according to the predetermined maximum angle of inclination of the stylus which is capable of being written, so as to ensure that there is a maximum contact area between the pen tip and the capacitive touch panel.

It is to be understood that both the foregoing general description and the following detailed description of the present invention are exemplary and explanatory and are intended to provide further explanation of the invention as claimed.

DETAILED DESCRIPTION OF THE INVENTION

Figure 1:
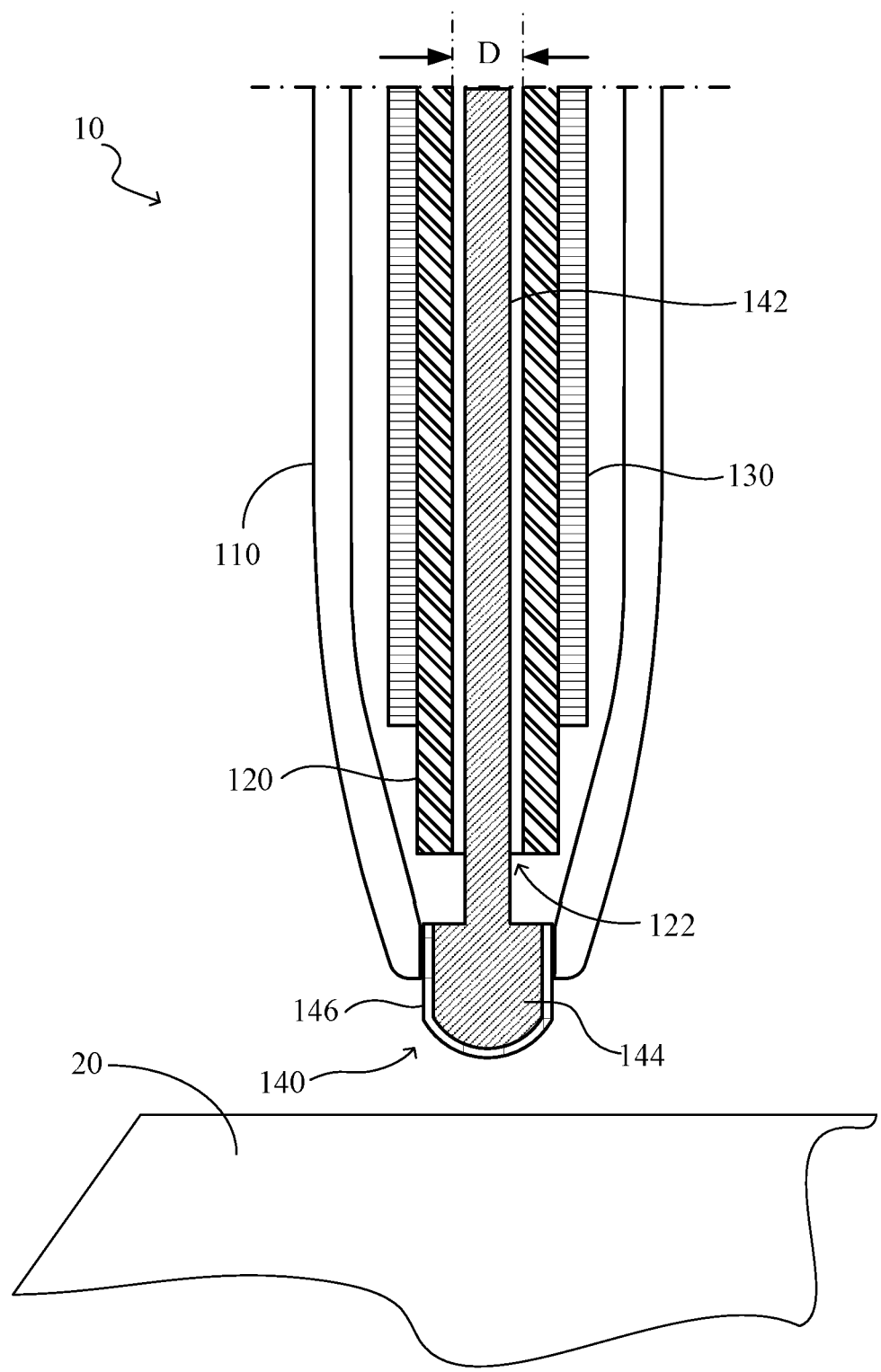
FIG. 1 depicts a perspective view illustrating a stylus according to a preferred embodiment of the present invention.

The present invention will now be described in detail with reference to a few preferred embodiments thereof as illustrated in the accompanying drawings. The same reference numerals refer to the same parts or like parts throughout the various figures.

Referring to FIG. 1, FIG. 1 depicts a perspective view illustrating a stylus according to a preferred embodiment of the present invention. The stylus 10 of the embodiment is utilized to perform input accompanying with a capacitive touch panel 20. It is worth mentioning that an induction coil (not shown) may be disposed around the capacitive touch panel 20 for interacting with the stylus 10 of the embodiment. The stylus 10 includes a housing 110, a magnetic core 120, an induction coil 130, and a pen tip 140. However, the stylus 10 of the embodiment can further include elements such as circuit board, pressure sensor, and so no which are well-known to a person skilled in the art. Thus, no further detail will be provided herein.

The magnetic core 120 is made of ferromagnetic materials, which contain three kinds of elements: iron, cobalt, and nickel. Specifically, the magnetic core 120 may be a magnetic powder core. The magnetic powder core is a soft magnetic material made by mixing and compressing ferromagnetic powders and insulating dielectric materials together. The magnetic core 120 may include iron powder core, aluminum ferrosilicon powder core, high-flux core, nickel-steel core (Permalloy), ferrite magnetic core, and so on. As shown in FIG. 1, the magnetic core 120 is disposed inside the housing 110. The magnetic core 120 has an axial through hole 122, and the axial through hole 122 defines a bore diameter D.

Referring to FIG. 1, the induction coil 130 is disposed inside the housing 110 and disposed around the magnetic core 120. Specifically, the induction coil 130 is electrically coupled to the circuit board (not shown). The induction coil 130 is configured to emit an electromagnetic signal to interact with the induction coil around the capacitive touch panel 20. That is to say, the electromagnetic signal corresponds to a pressure on the pen tip 140 while writing, so that an external host (such as computer or mobile device) can be based on a sense of the induction coil to calculate the response of the measured pressure signal size.

Referring to FIG. 1 again, the pen tip 140 is disposed at an end of the housing 110. The pen tip 140 is made of conductor, so that a change of capacitance occurs on the capacitive touch panel 20 when the pen tip 140 is close to or contacts the capacitive touch panel 20. Thus, the touch position can be obtained by an original position-sensing mechanism of the capacitive touch panel 20. As shown in the drawing, the pen tip 140 has a rod portion 142 and a contacting portion 144. The rod portion 142 is inserted into the axial through hole 122. An end of the rod portion 142 may be coupled to the pressure sensor (not shown), thereby sensing the pressure in axial direction. Actually, the diameter of the rod portion 142 is slightly less than the bore diameter D of the axial through hole 122.

In other embodiments, when the pen tip 140 contacts the capacitive touch panel 20, the magnetic core 120 and the induction coil 130 have an axial relative movement. That is to say, the magnetic core 120 can move with the movement of the pen tip 140, and thus an axial displacement is formed in the housing 110. Furthermore, the movement of the pen tip 140 changes according to the force that exerts to the stylus. Therefore, the greater the force that exerts to the stylus, the greater the movement of the pen tip 140. Thus, the relative movement of the magnetic core 120 and the induction coil 130 is greater. Similarly, the smaller the force that exerts to the stylus, the smaller the movement of the pen tip 140. Thus, the relative movement of the magnetic core 120 and the induction coil 130 is smaller. On the other hand, when the axial relative movement occurs between the magnetic core 120 and the induction coil 130, the inductance L of the induction coil 130 also changes, and then the electromagnetic signal changes.

Figure 2:
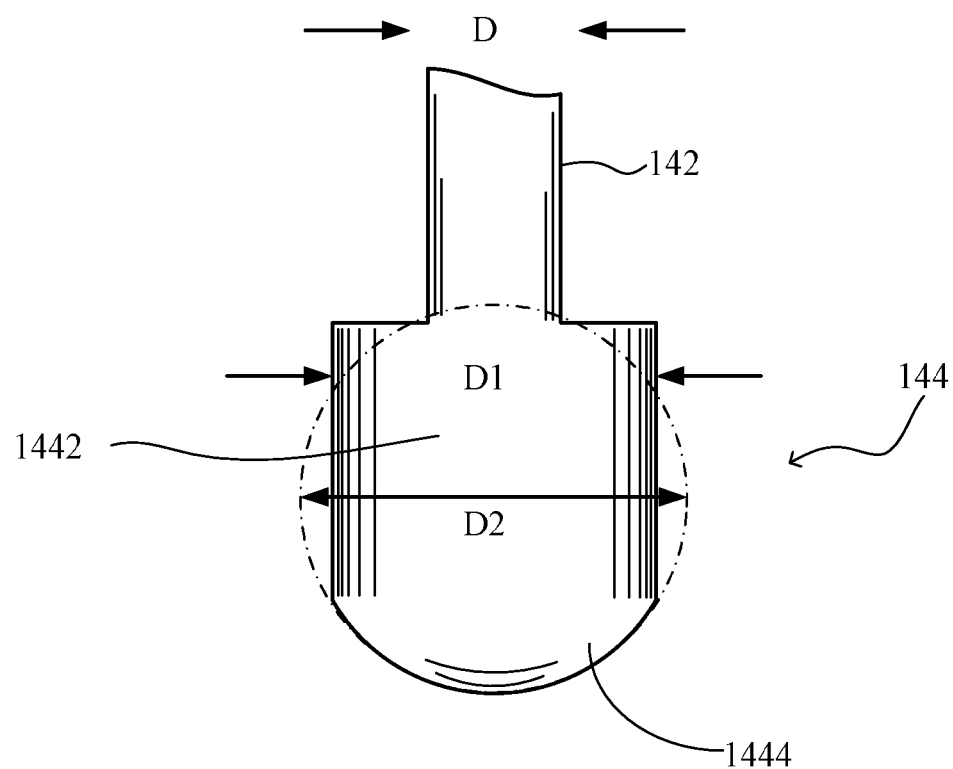
FIG. 2 is a local zoom drawing illustrating the pen tip of FIG. 1.

Referring to FIG. 1 and FIG. 2, FIG. 2 is a local zoom drawing illustrating the pen tip 140 of FIG. 1. The contacting portion 144 protrudes from the housing 110. The contacting portion 144 has a cylindrical surface 1442 and a part spherical surface 1444, and the cylindrical surface 1442 is coupled to the part spherical surface 1444. As shown in FIG. 2, the cylindrical surface 1442 defines a first diameter D1, i.e. the diameter of the cylinder. The part spherical surface 1444 defines a second diameter D2, i.e. the diameter of the sphere. More specifically, the first diameter D1 is less than the second diameter D2, and the first diameter is greater than or equal to the bore diameter D.

It can be seen from the foregoing that the pen tip 140 contacts the capacitive touch panel 20 through the part spherical surface 1444 of the contacting portion 144. Furthermore, because the second diameter D2 is larger than the first diameter D1, the contact area between the part spherical surface 1444 and capacitive touch panel 20 increases so as to ensure that a sufficient capacitance change is generated. On the other hand, the first diameter D1, the diameter of the cylinder, is larger than the bore diameter D, so the contacting portion 144 of the contact area can be increased without restriction of the size of the axial through hole 122. Meanwhile, because the axial through hole 122 doesn't have to be enlarged, the volume of the magnetic core 120 may also increase. Accordingly, magnetic flux of the magnetic core 120 in the induction coil 130 is increased, thereby increasing strength of the electromagnetic signal.

As shown in FIG. 1, It is worth mentioning that the contacting portion 144 of the pen tip 140 has a coating 146 thereon. The coating 146 is utilized to alter a frictional force while writing or has the purpose of protecting a cover glass on the capacitive touch panel 20. Preferably, the thickness of the coating 146 is between 0.1 and 2 millimeters. Moreover, the coating 146 is made of conductor or non-conductor. In the embodiment, the coating 146 is made of conductive plastic. However, the present invention is not limited thereto.

Figure 3:
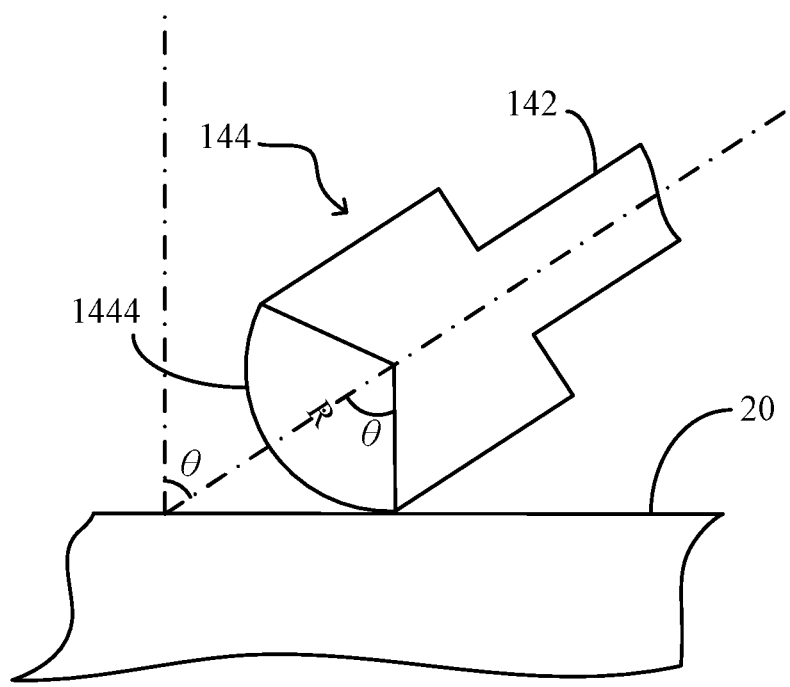
FIG. 3 is a schematic drawing illustrating the pen tip of the stylus being in the maximum angle of inclination.

In the stylus 10 of the preferred embodiment of the present invention, parameters of the part spherical surface 1444 of the contacting portion 144 can be designed according to a predetermined maximum angle of inclination of the stylus which is capable of being written. Referring to FIG. 3, FIG. 3 is a schematic drawing illustrating the pen tip 140 of the stylus 10 being in the maximum angle of inclination. The part spherical surface 1444 defines a radian (or radius) R which corresponds to the maximum angle θ of inclination of the stylus 10 which is capable of being written. More specifically, half the angle which corresponds to the radius R is the maximum angle θ of inclination. In the embodiment, the radian R is between $\pi/2$ and $2\pi/3$, in which the angle corresponding to $\pi/2$ is 90 degrees, and the angle corresponding to $2\pi/3$ is 120 degrees. It can be seen from the foregoing that the maximum angle θ of inclination corresponding to the radian R of $\pi/2$ is 45 degrees, and the maximum angle θ of inclination corresponding to the radian R of $2\pi/3$ is 60 degrees. Therefore, the radius R of the part spherical surface 1444 can be designed to have a maximum contact area on the capacitive touch panel 20 for ensuring a sufficient capacitance reaction according to the predetermined maximum angle θ of inclination.

In summary, the present invention employs the conductive/metallic pen tip 140, so the stylus 10 can execute the position detection with the capacitive touch panel. In addition, based on the second diameter D2 of the part spherical surface 1444 being larger than the first diameter D1 of the cylindrical surface 1442, the contact area between the pen tip 140 and the capacitive touch panel 20 can be increased so as to increase the capacitance reaction. Moreover, the present invention also can design the appropriate radian R of the part spherical surface 1444 according to the predetermined maximum angle θ of inclination of the stylus 10 which is capable of being written, so as to ensure that there is the maximum contact area between the pen tip 140 and the capacitive touch panel 20.

While the preferred embodiments of the present invention have been illustrated and described in detail, various modifications and alterations can be made by persons skilled in this art. The embodiment of the present invention is therefore described in an illustrative but not restrictive sense.

What is claimed is:

1. A stylus for use with a capacitive touch panel, comprising:
   a housing;
   a magnetic core disposed inside the housing, the magnetic core having an axial through hole which defines a bore diameter; and
   a pen tip disposed at an end of the housing, the pen tip being made of conductor, the pen tip having a rod portion and a contacting portion, wherein the rod portion is inserted into the axial through hole, and the contacting portion protrudes from the pen shell, and wherein the contacting portion has a cylindrical surface and a part spherical surface, the cylindrical surface defining a first diameter, the part spherical surface defining a second diameter, and wherein the first diameter is less than the second diameter, and the first diameter is greater than or equal to the bore diameter, and wherein the part spherical surface defines a radian which is between $\pi/2$ and $2\pi/3$.

2. The stylus of claim 1, wherein the contacting portion of the pen tip has a coating thereon.

3. The stylus of claim 2, wherein the coating is made of conductor or non-conductor.

4. The stylus of claim 2, wherein the coating is made of conductive plastic.

5. The stylus of claim 1, wherein the radian corresponds to a maximum angle of inclination of the stylus which is capable of being written.

6. The stylus of claim 5, wherein the maximum angle of inclination corresponding to the radian of $\pi/2$ is 45 degrees, and the maximum angle of inclination corresponding to the radian of $2\pi/3$ is 60 degrees.

7. The stylus of claim 1, further comprising an induction coil which is disposed inside the housing and disposed around the magnetic core.

8. The stylus of claim 7, wherein the induction coil is utilized to emit an electromagnetic signal.

9. The stylus of claim 8, wherein the electromagnetic signal corresponds to a pressure on the pen tip while writing.

\* \* \* \* \*